United States Patent [19]
Balatoni et al.

[11] Patent Number: 5,691,718
[45] Date of Patent: Nov. 25, 1997

[54] DUAL 4-WIRE ANALOG DATA MULTIPLEXER

[75] Inventors: Nicholas A. Balatoni, Santa Clara; Tom Blackburn, San Jose; C. David Dow, Foster City, all of Calif.

[73] Assignee: Raychem Corporation, Menlo Park, Calif.

[21] Appl. No.: 482,264

[22] Filed: Jun. 7, 1995

[51] Int. Cl.$^6$ .................................................. H03M 1/00
[52] U.S. Cl. .................. 341/126; 341/144; 341/155; 370/112; 370/118; 375/240
[58] Field of Search ................................ 341/155, 144, 341/126; 370/112, 118; 375/240

[56] References Cited

U.S. PATENT DOCUMENTS

| | | | |
|---|---|---|---|
| 3,660,606 | 5/1972 | DeWitt | 179/15 BA |
| 3,711,650 | 1/1973 | Kuhn et al. | 179/15 BW |
| 3,851,106 | 11/1974 | Jacobaeus | 179/15 AP |
| 3,922,493 | 11/1975 | Brenig et al. | 179/15 AP |
| 4,112,427 | 9/1978 | Hofer et al. | 340/347 C |
| 4,145,574 | 3/1979 | Wintzer | 179/15 A |
| 4,417,333 | 11/1983 | Cochennec | 370/66 |
| 4,519,073 | 5/1985 | Bertocci et al. | 370/118 |
| 4,594,707 | 6/1986 | Merritt et al. | 370/91 |
| 4,740,963 | 4/1988 | Eckley | 370/110.1 |
| 4,751,696 | 6/1988 | Black | 370/58 |
| 4,755,994 | 7/1988 | Staples et al. | 370/118 |
| 4,788,680 | 11/1988 | Kikuchi et al. | 370/68 |
| 4,924,492 | 5/1990 | Gitlin et al. | 379/93 |
| 5,111,497 | 5/1992 | Bliven et al. | 379/27 |
| 5,140,630 | 8/1992 | Fry et al. | 379/179 |
| 5,160,929 | 11/1992 | Costello | 341/57 |
| 5,473,613 | 12/1995 | Bliven | 370/112 |
| 5,544,323 | 8/1996 | Heaton et al. | 395/200.14 |

FOREIGN PATENT DOCUMENTS

| | | | |
|---|---|---|---|
| 0 009 557 | 4/1980 | European Pat. Off. | H04L 25/49 |
| WO 85/02960 | 7/1985 | WIPO | H04L 5/04 |
| WO 91/01600 | 2/1991 | WIPO | H04J 3/04 |

OTHER PUBLICATIONS

"Optical Fiber Driver and Receiver using a Three-Level Flux Mode Encoded by a Simplified Bipolar Differential Biphase Bichannel Code", *IBM Technical Disclosure Bulletin*, vol. 27, No. 4A, Sep. 1984.

"Dual Digital Transmission System for Multipair Cables Based on 'Crank-Shaft Coding'", *Electronics Letters*, 19th Jul. 1984, vol. 20, No. 15, pp. 619–621.

Advertising materials for Pairspan™-2 Two-Line Digital Carrier System, Optilink Corporation, May 1989.

Optilink Corporation Pairspan™-2 Digital Subscriber Carrier System Product Line Description (Jul. 20, 1989).

Bellamy, John, Digital Telephony, John Wiley & Sons (1982).

Siemens, Telecommunications Data Book (1987) pp. 5–20, 5–21.

Kawakami, Masachika, Toshiyuki Ishikawa and Hitoshi Hiraike, Improved Subscriber Loop Multiplexing Systems for Rural Areas, Japan Telecommunications Review (Apr. 1978).

Kaiser, W.A. and H.T. Hagmeyer, Digital Two-Wire Local Connection Providing Office Subscribers with Speech, Data and New Teleinformation Services (Mar. 20–24, 1978).

Pacific Bell, Request for Quote, Digital Added Main Line (Jun. 14, 1989).

(List continued on next page.)

*Primary Examiner*—Jeffrey A. Gaffin
*Assistant Examiner*—Jason L. W. Kost
*Attorney, Agent, or Firm*—Herbert G. Burkard; Bruce M. Bertram; Townsend and Townsend and Crew

[57] ABSTRACT

An improved method and apparatus for transmission of dual 4-wire analog data services between a telephone company location and a subscriber premises over a single twisted pair, providing a 4:1 pair gain. In a preferred embodiment the invention provides for method and apparatus for transmission of multiple analog data signals for dual 4-wire analog data services over a single twisted pair from telephone company equipment to a subscriber, using 2B1Q or 4B3T digital signals.

13 Claims, 5 Drawing Sheets

OTHER PUBLICATIONS

Bell Atlantic Network Services, Inc., Request for Quotation RFQ#90BGP0018.

Eastern Communications Forum 88 (May 2–4, 1988).

Rockwell International, Dualline Plus Data Sheet (1990).

Advertising materials for "DigiLoop", ECI Telecom, (Undated, however, received after filing of application 07/385,610, Jul. 25, 1989).

Advertising materials for "DAML–100", Whelock, Inc. (Undated, however, received after filing of application 07/385,610, Jul. 25, 1989).

Advertising materials for Pairgain 2, Digital Pair Saver, Pairgain Technologies (Undated, however, received after filing of application 07/385,610, Jul. 25, 1989).

Siemens, ISDN Communications Controller ICC PEB 2070 Data Sheet Rev. 3.0, (Jul. 1988).

American National Standard for Telecommunications, ANSI T1,601–1988, Integarted Services Digital Network (ISDN) Basic Access Interface for Use on Metallic Loops for Application on the Network Side of the NT (Layer 1 Specification) (Sep. 16, 1988).

Pacific Bell/Nevada Bell Requirements and Objectives for Digital Added Main Line, Pub L–780057–PB/NB, Issue 1 (May 1989).

Letter from David Bliven to Nynex Material Enterprises (Jan. 23, 1989) (with Request for Proposal (next entry)).

New York Telephone Marketing & Technology, Request for Proposal RFP First Generation Universal Digital Channel System (FGUDC) (Dec. 1988).

Siemens, Preliminary Dual Channel Codec Filter (SICOFI2) PEB 2260 data, Sheet, Rev. 1.0, Jan. 1989.

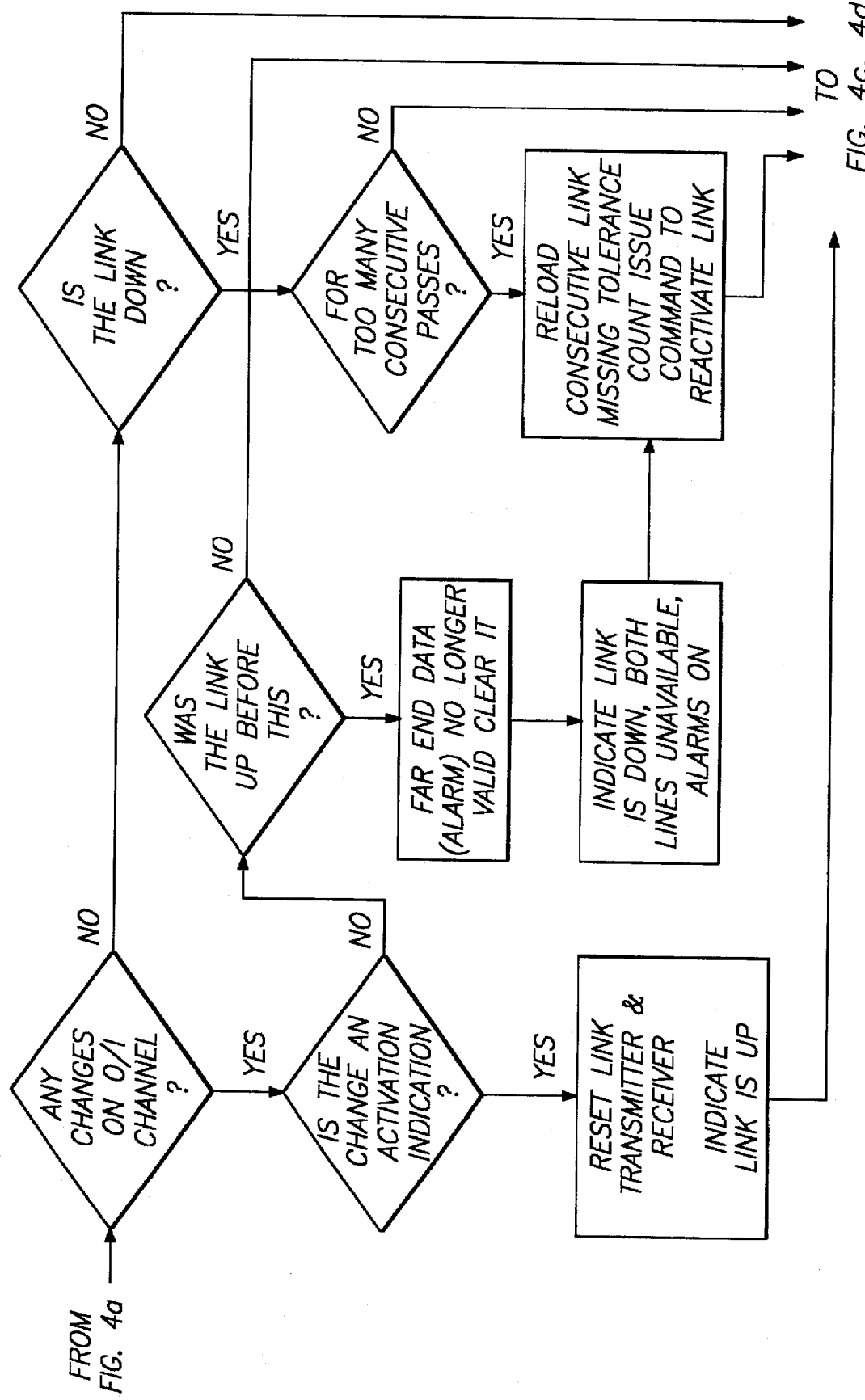

DUAL 4-WIRE ANALOG DATA MULTIPLEXER

CROSS-REFERENCES

This application is related to PCT International publication Number WO 91/01600, published Febr. 7, 1991, and to U.S. Pat. No. 5,111,497 issued on May 5, 1992 to Bliven et al., both of which are completely incorporated by reference for all purposes. This application is also related to application Ser. No. 08/408,020 (Attorney Docket No. 13009-27/MP1551-US1), to application Ser. No. 08/408,585 (Attorney Docket No. 13009-21/MP1527-US1), and to application Ser. No. 08/408,610 (Attorney Docket No. 13009-25/MP1549-US1), all filed on Mar. 20, 1995. This application is also related to application Ser. No. 08/485,460 (Attorney Docket No. 13009-26/MP1550-US1), filed on the same day as the present application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to the field of telecommunications. More particularly, in one embodiment the present invention provides a method and apparatus for transmitting high quality dual 4-wire analog data service to subscribers over a single twisted pair.

Conventional techniques for providing analog data service to customer premises from the telephone company central office have been implemented over 2-wire facilities. Information transfer usually relied on frequency division multiplexing (FDM), i.e., the transmission of fixed in-band frequencies over short durations, representing ones and zeroes. Different frequency bands (a high band and a low band) are dedicated to transmitting in two different directions (e.g., a send direction and a receive direction) for duplex transmission mode. However, 2-wire data rates have been fairly low, e.g., up to 9600 baud, due to interference between frequencies, usually the result of impairments on the twisted pair line, lack of proper balance in the network hybrid interfaces, or the like.

In order to decrease the interference and increase the accuracy of data transmission, techniques for providing analog data transmission to customer premises from the telephone company central office have been implemented over 4-wire facilities. With 4-wire transmission, data in each direction is transmitted over a separate wire pair. That is, one twisted pair line is dedicated for analog data transmission in one direction and another twisted pair line is dedicated for analog data transmission in the other direction.

This type of 4-wire transmission of analog data service is increasingly provided mainly to business subscribers, such as banks, who demand high rate data accuracy and reliability of information transmission. Banks or the like often desire improved high quality analog data service with low bit error rates in transferring important financial information using equipment such as 4-wire analog data modems (e.g., Bell modem models: 201, 202 to 208) or the like. Many such subscribers who already have existing 4-wire leased line facilities at the subscriber location often require additional analog data services to accommodate increasing accurate information transmission needs. With the use of 4-wire transmission, the data rates can be increased and analog data sent with lower bit error rates, but at the cost of an extra twisted pair line as compared to 2-wire FDM transmission which uses one twisted pair line. Some business subscribers with existing 4-wire connections may desire additional 4-wire analog data service which often requires the telephone company to install two additional twisted pairs to provide the additional leased line, which is often costly and time consuming.

As customer demand for 4-wire analog data service rises, it is desirable and economical for telephone companies to save expensive copper by reducing the number of twisted pair lines, while providing or maintaining 4-wire analog data service to customers. Furthermore, telephone companies may desire to provide service where otherwise they could not, due to a lack of copper twisted pair lines between a telephone company location and a customer location. In particular, when confronted with increasing customer demand for 4-wire analog data service and inadequate numbers of existing twisted pair lines to meet the demand in that geographical area, telephone companies are faced with the difficult prospect of either not providing service or providing service by laying new cable. Providing service by either of these means can be labor intensive, very time consuming, unreliable and/or expensive.

Despite advances in multiplexing techniques, problems remain. For example, some multiplexing techniques continue to require complex engineered and, therefore, uneconomical equipment to transmit high quality 4-wire analog data service. It is desirable to provide simpler, more economical method and apparatus for providing high quality dual 4-wire analog data services.

Providing additional 4-wire analog data service over an existing wire pair without over-provisioning would greatly relieve 4-wire data circuit congestion in an efficient and economic manner. For example, T1/E1 over-provisioning may provide dual 4-wire analog data service but on fewer channels than their normal 24/30 channel service capacity, leading to inefficiency due to the unused channels. The cost of providing T1/E1 systems which are over-provisioned to meet increased customer demands often can be at least $10,000 to $15,000 or greater. A more economical method for providing additional services without over-provisioning is often desirable.

In addition, providing additional 4-wire analog data service without over-provisioning involves time and labor intensive efforts by the telephone company. For example, telephone companies often find it necessary to specially condition pre-existing telephone lines before being able to offer high-speed 4-wire analog data service. Telephone lines are conditioned so that they substantially have no abrupt changes in impedance values from wire gauge changes, bridge taps, coils, and the like, by removing such wire gauge changes, bridge taps, coils, and the like before implementing analog data services onto the pre-existing telephone lines. The telephone lines typically undergo this special conditioning, known as C2 data conditioning, in order to improve their performance for analog data communication applications. The C2 data conditioning technique often takes from one to two weeks or longer for a typical 10–12 kilo-feet 4-wire local loop, which is often costly and time consuming.

It is desirable to provide an improved, more economical and efficient method and related apparatus for providing dual 4-wire analog data service over a single twisted pair line. Providing high quality dual 4-wire analog data service over an existing single twisted pair between the central office and the subscriber premises with a 4:1 pair gain savings is especially desirable, since it is often difficult and uneconomical for the telephone company to provide additional leased lines for an additional 4-wire analog data service due to increasing labor, installation, and copper costs.

SUMMARY OF THE INVENTION

An improved method and apparatus for transmission of multiple 4-wire analog data services over a single twisted pair is disclosed. In a specific embodiment the invention provides for transmission of multiple analog data signals for dual 4-wire analog data services over a single twisted pair from a telephone company location to a subscriber location for a 4:1 pair gain savings.

In a specific embodiment, the invention provides a method for providing dual 4-wire analog data services between a telephone company location and a customer premises over a single twisted pair. The method includes, at the telephone company location, converting two downstream analog data signals into a downstream multiplexed binary signal and converting an upstream multiplexed binary signal into two upstream analog data signals. The method also includes converting the downstream multiplexed binary signal and the upstream multiplexed binary signal to a digital encoded signal, which may be a 2B1Q or 4B3T signal. The method further includes transmitting the digital encoded signal over said single twisted pair between the telephone company location and the customer premises. At the customer premises, the method includes converting the digital encoded signal into the downstream multiplexed binary signal and the upstream multiplexed binary signal. The method additionally includes converting the downstream multiplexed binary signal into two downstream analog data signals for use by two 4-wire analog data circuits at the customer premises and converting two upstream analog data signals from said two 4-wire analog data circuits at the customer premises into the upstream multiplexed binary signal.

According to another embodiment, the invention provides apparatus for providing dual 4-wire analog data services between a telephone company location and a customer location over a single twisted pair. The apparatus has a remote terminal for use at the customer location that includes a remote terminal IECQ for converting a digital encoded signal on the single twisted pair to multiplexed binary signals, and a remote terminal ICC coupled to the remote terminal IECQ for adding and removing control information to and from the multiplexed binary signals. The remote terminal also includes a remote terminal SICOFI coupled to the remote terminal ICC for converting multiplexed binary signals from and to the remote terminal IECQ to and from four analog data signals for use in two 4-wire analog data circuits coupled to the remote terminal SICOFI. The apparatus also has a central office terminal that includes a central office terminal SICOFI for converting four analog data signals at a telephone company location to and from multiplexed binary signals, and a central office terminal ICC coupled to the central office terminal SICOFI for adding and removing control information to and from multiplexed binary signals from the central office terminal SICOFI. The central office terminal also includes a central office terminal IECQ coupled to the central office terminal ICC for conversion of multiplexed binary signals to digital encoded signal for transmission over the single twisted pair, and the digital encoded signal may be 2B1Q and 4B3T signals.

In a further embodiment, the invention provides a method for converting a system for transmission of a single analog signal from a telephone company location to a subscriber location over a single twisted pair, into a system for multiple analog data signal transmission over a single twisted pair. The present method includes installing a central office terminal at the telephone company location, and installing a remote terminal at the subscriber location. The installed central office terminal inputs multiple downstream analog data signals from telephone company equipment and outputs multiple upstream analog data signals to the telephone company equipment, and converts the multiple downstream analog data signals and the multiple upstream analog data signals into a digital encoded signal for transmission over a single twisted pair between the telephone company location and the subscriber location. The installed remote terminal converts the digital encoded signal from the single twisted pair into the multiple upstream analog data signals and multiple downstream analog data signals, and transmits the multiple downstream analog data signals to multiple 4-wire analog data circuits and receives the multiple upstream analog data signals from the multiple 4-wire analog data circuits.

BRIEF DESCRIPTION OF THE DRAWINGS

FIGS. 4a–4d are simplified flow diagrams of the microprocessor/software functionality in an embodiment of the present invention.

DESCRIPTION OF THE SPECIFIC EMBODIMENTS

CONTENTS

I. General
II. Digital Data Transmission
   A. Central Office Terminal (COT) Hardware
   B. Remote Terminal (RT) Hardware
   C. RT/COT Components
   D. Software/Microprocessor Functionality
III. Conclusion I. General In a specific embodiment, the present dual 4-wire analog data multiplexer provides dual 4-wire analog data services between a telephone company location such as a central office or the like, and a customer premises such as a business or the like over a single twisted pair line. The specific embodiment provides a 4:1 pair gain and leads to better efficiency in the deployment of copper and the like, while economically providing high data rate accuracy and high quality analog data transmission for dual 4-wire analog data services without over-provisioning.

Figure 1:
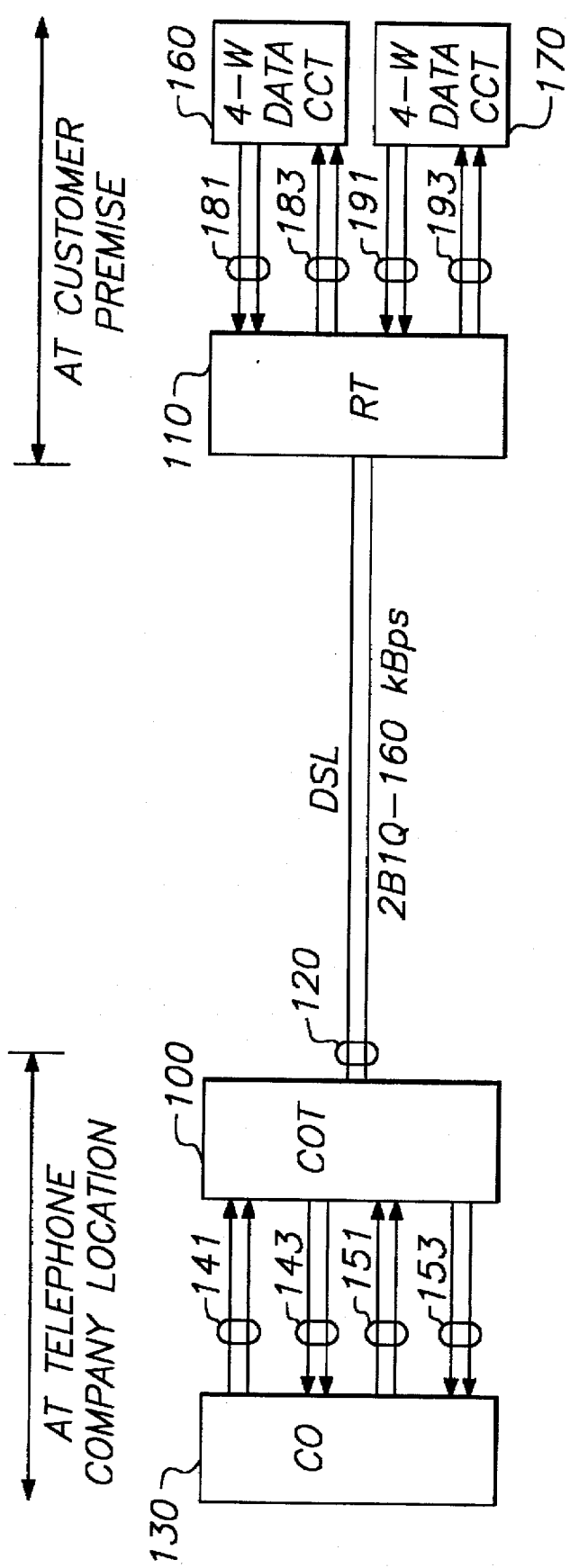
FIG. 1 illustrates a general block diagram of the dual 4-wire analog data multiplexer according to an embodiment of the present invention.

FIG. 1 illustrates a general block diagram of the dual 4-wire analog data multiplexer according to an embodiment of the present invention. The dual 4-wire analog data multiplexer includes a dual 4-wire analog data central office terminal (COT) 100 at a telephone company location, such as a central office (CO) location or the like, and a dual 4-wire analog data remote terminal (RT) 110 at a customer premises. Of course, COT 100 may be a central office terminal, a line card installed in a shelf at the central office, or the like. Between the telephone company location and the customer premises is a 2-wire digital subscriber loop (DSL) 120, which is a single twisted pair line. DSL 120 transmits a 2B1Q formatted digital signal containing information for dual 4-wire analog data services using the ISDN Basic Rate Access technology (2B+D, two 64 kilobits/second (kbps) Bearer channels and a 16 kbps Data channel) at 160 kbps for at least a 18 kilo-feet line span of mixed gauge wire. Each 4-wire analog data service uses one of the 64 kbps B-channels for both send and receive directions of transmission, and uses the 16 kbps D-channel for line control. Alternatively, the digital signal may be in a 4B3T format, as well as others.

The directions of the signals discussed will be described herein as follows. A "downstream" signal is one that travels in a direction from the telephone company location toward the customer premises. An "upstream" signal is one that travels in the direction from the customer premises toward the telephone company location.

At the telephone company location, telephone company equipment 130 (which may be a switch or exchange or channel bank) is coupled to COT 100 via twisted pair lines 141, 143, 151, and 153. Each of lines 141, 143, 151, and 153 is a 2-wire twisted pair. COT 100 is coupled to RT 110 via DSL 120. At the customer premises, RT 110 is coupled to a first 4-wire analog data circuit 160 And to a second four-wire analog data circuit 170. In particular, RT 110 is coupled to the first 4-wire analog data circuit via twisted pair lines 181 and 183. RT 110 is also coupled to the second 4-wire analog data circuit 170 via twisted pair lines 191 and 193. Each of lines 181, 183, 191, and 193 is a 2-wire twisted pair.

At the telephone company location, twisted pair line 141 is for transmitting a first downstream analog data signal from telephone company equipment 130 for use by first 4-wire analog data circuit 160, and twisted pair line 143 is for receiving a first upstream analog data signal from the first 4-wire analog data circuit 160 for use at telephone company equipment 130. Similarly, twisted pair line 151 is for transmitting a second downstream analog data signal from telephone company equipment 130 for use by the second 4-wire analog data circuit 170, and twisted pair line 143 is for receiving a second upstream analog data signal from the second 4-wire analog data circuit 170 for use at telephone company equipment 130.

At the telephone company location, COT 100 receives the first downstream analog data signal for the first 4-wire analog data circuit 160 and the second downstream analog data signal for the second 4-wire analog data circuit 170 from telephone company equipment 130 for conversion into a 2B1Q signal at a 160 kbps information rate (i.e., a 80 kbaud symbol rate) for two-wire transmission over DSL 120 for use by RT 110. COT 100 also converts the 2B1Q signal from DSL 120 into the first upstream analog data signal for the first 4-wire analog data circuit 160 and the second upstream analog data signal for the second 4-wire analog data circuit 170 for use at telephone company equipment 130 at the central office.

At the customer premises, RT 110 performs similar functions as COT 100. RT 110 receives the 160 kbps 2B1Q signal over DSL 120 for conversion into the first downstream analog data signal for the first 4-wire analog data circuit 160 via twisted pair line 183, and the second downstream analog data signal for the second 4-wire analog data circuit 170 via twisted pair line 193. RT 110 also receives the first upstream analog data signal from the first 4-wire analog data circuit 160 via twisted pair line 181 and the second upstream analog data signal from the second 4-wire analog data circuit 170 via twisted pair line 191 for conversion into the 2B1Q signal transmitted over DSL 120 for use by COT 100. Twisted pair line 181 is for transmitting the first upstream analog data signal from the first 4-wire analog data circuit 160 to RT 110, and twisted pair line 191 is for transmitting the second upstream analog data signal from the second 4-wire analog data circuit 170 to RT 110. Similarly, twisted pair line 183 is for transmitting the first downstream analog data signal from RT 110 to the second 4-wire analog data circuit 170, and twisted pair line 193 is for transmitting the second downstream analog data signal from RT 110 to the second 4-wire analog data circuit 170.

Accordingly, COT 100 and RT 110 provide dual 4-wire analog data service transmission over a single twisted pair 120, thereby providing a 4:1 pair gain by using each B-channel for the send and receive direction signals of one 4-wire analog data service. The 4-wire analog data circuits 160 and 170 may include devices such as analog modems, direct connect modems, and others. Of course, the type of 4-wire analog data circuit depends upon the particular application, but typically these are dedicated or "nailed-up" services rather than switched services.

II. Digital Data Transmission

A. Central Office Terminal (COT) Hardware

Figure 2:
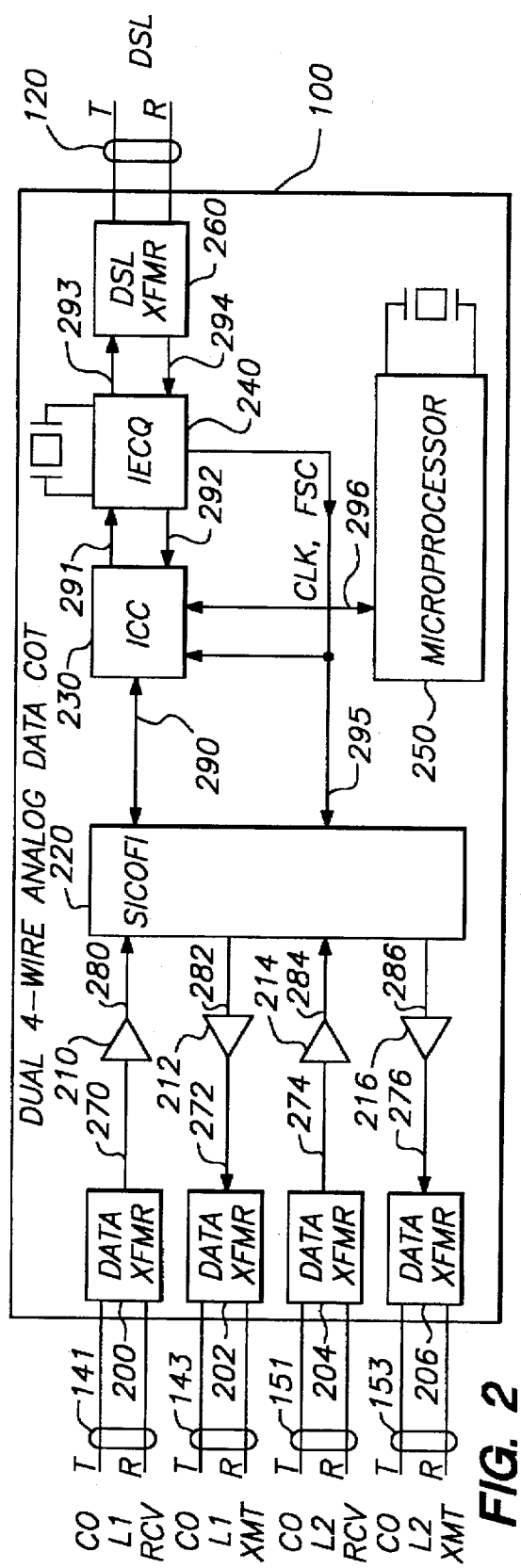
FIG. 2 illustrates a simplified block diagram of the central office terminal (COT) of an embodiment of the present invention.

FIG. 2 illustrates a simplified block diagram of COT 100 according to the present invention. COT 100 includes data transformers 200, 202, 204 and 206, amplifying circuits 210, 212, 214 and 216, a dual channel codec filter (SICOFI) integrated circuit chip 220, an ISDN communications controller (ICC) integrated circuit chip 230, an ISDN echo cancellation-quaternary (IECQ) integrated circuit chip 240, a microprocessor 250, a DSL transformer 260, and other elements.

Data transformers 200, 202, 204 and 206 are coupled, respectively, to twisted pair lines 141, 143, 151 and 153 which are coupled to telephone company equipment 130 at the telephone company location. Each twisted pair line 141, 143, 151 and 153 includes tip (T) and ring (R) lines. Amplifying circuits 210, 212, 214 and 216 are coupled, respectively, to data transformers 200, 202, 204 and 206 via respective lines 270, 272, 274 and 276. Amplifying circuits 210, 212, 214 and 216 are also coupled, respectively, to SICOFI 230 via respective lines 280, 282, 284 and 286. SICOFI 230 is coupled to ICC 230 via a serial input/output port (SIP) bus line 290. ICC 230 is coupled to IECQ 240 via lines 291 and 292. IECQ 240 is also coupled to DSL transformer 260 via lines 293 and 294. DSL transformer 260 is also coupled to DSL 120, which includes tip (T) and ring (R) lines.

COT 100 will first be described primarily with respect to downstream signals transmitted from the central office over DSL 120 for use at the customer premises.

From telephone company equipment 130, the first and second downstream analog data signals, respectively, enter data transformer 200 via line 141 and data transformer 204 via line 151 for isolation, conditioning, and impedance matching. First and second downstream analog data signals then enter amplifying circuits 210 and 214, respectively, for amplification before entering SICOFI 220 via respective lines 280 and 284. SICOFI 220 converts the first downstream analog data signal into binary 8-bit pulse code modulation encoded (PCM) words, where each word represents a digital encoding of a sample of the first downstream analog data signal, at a sampling rate of 8 kHz (resulting in a first 64 kbps downstream binary signal). SICOFI 220 also converts the second downstream analog data signal into binary 8-bit PCM words, at a sampling rate of 8 kHz (resulting in a second 64 kbps downstream binary signal). SICOFI 220 multiplexes the first and second downstream binary signals along with control and indication (C & I) and monitoring data for transmission to ICC 230 via SIP bus line 290. Over SIP bus line 290, SICOFI 220 sends (during the downstream portion of each 125 microsecond sampling interval) 8 bits of the first downstream binary signal on one B-channel, 8 bits of the second downstream binary signal on the other B-channel, 8 bits of C & I data, and 8 bits of monitor data, resulting in a unidirectional downstream multiplexed binary signal of 32 bits/125 microseconds with a total bit rate of 256 kbps to ICC 230. A unidirectional upstream multiplexed binary signal of 32 bits/125 microseconds with a total bit rate of 256 kbps is then transmitted (during the upstream portion of each 125 microsecond sampling interval) from ICC 230 to SICOFI 220 via SIP bus line 290. This process repeats 8,000 times per second over this 512 kbps bi-directional "ping-pinged" transmission line 290, thereby permitting substantially simultaneous transmission/reception of two 4-wire analog data services.

The bi-directional "ping-ponged" transmission of the two 256 kbps multiplexed signals requires the use of a 512 kHz clock signal for synchronization. This 512 kHz clock signal is provided by IECQ 240 to SICOFI 220 & ICC 230 over line 295.

ICC 230 transmits the unidirectional 256 kbps downstream multiplexed binary signal received from SICOFI 220 to IECQ 240 via line 291. IECQ 240 converts the downstream 256 kbps multiplexed binary signal into a bit stream containing the 160 kbps of user information for encoding onto a 160 kbps 2B1Q signal by removing the C & I and monitor data for its use. IECQ 240 converts the 160 kbps signal to an 80 kbaud 2B1Q signal for two-wire transmission over DSL 120. In the specific embodiment, ICC 230 operates at a clock signal (CLK) at 512 kHz and a frame synchronization clock signal (FSC) at 8 kHz. The CLK and FSC signals are also provided from IECQ 240 to ICC 230 and SICOFI 220 via line 295.

DSL transformer 260 performs four-wire to two-wire conversion. IECQ 240 sends its downstream data via line 293 into DSL transformer 260 and receives upstream data via line 294 from DSL transformer 260, which conditions and impedance matches the data signals for two-wire transmission over DSL 120, a single twisted pair line, to the customer premises at RT 110. The span of DSL 120 may be up to 18 kilo-feet on typically mixed 24/26 gauge twisted pair lines without the use of any repeaters or the like. At wire gauges larger than the mixed 24/26 gauge, the span may be up to 33 kilo-feet and even greater.

The functionality of COT 100 is overseen by microprocessor 250. Monitor data, link status, and other data which the microprocessor 250 polls are made available to microprocessor 250 via line 296 from ICC 230. A clock provides timing information for the microprocessor 250 and the other components in COT 100 and, ultimately, the RT 106.

Upstream signals from DSL 120 are processed by COT 100 in a similar but reverse method from the downstream signals. In particular, the 2BiQ signal at 160 kbps information rate (i.e., 80 kbaud symbol rate) enters DSL transformer 260 which conditions, impedance matches, and performs two-wire to four-wire conversion of the 2B1Q signal for use in IECQ 240. The upstream data of the 2B1Q signal enters IECQ 240 from DSL transformer 260 via line 294. By adding C & I and monitor data, IECQ 240 converts the 160 kbps upstream data of the 2B1Q signal into the unidirectional 256 kbps upstream multiplexed binary signal for use in ICC 230 via line 292.

ICC 230 transmits the 256 kbps upstream multiplexed binary signal via SIP bus line 290 as part of the 512 kbps bi-directional "ping-ponged" transmission discussed earlier. Over SIP bus line 290, the upstream multiplexed binary signal exits ICC 230 as an 8-bit PCM word for the first upstream binary signal in one B-channel, an 8-bit PCM word for the second upstream binary signal in the other B-channel, an 8-bit word for C & I data, and an 8-bit word for monitor data, during the upstream portion of each 125 microsecond sampling interval.

SICOFI 220 receives and converts (demultiplexes) the appropriate 8-bit PCM words into the respective analog data signals, thereby providing the first and second upstream analog data signals, respectively, via lines 282 and 286 to amplifying circuits 212 and 216 for amplification.

The amplified first upstream analog data signal then enters data transformer 202 via line 272, and the amplified second upstream analog signal enters data transformer 206 via line 276. Data transformers 202 and 206 isolate, condition, and impedance match their respective upstream analog data signals for use in telephone company equipment 130 via respective twisted pair lines 143 and 153. Accordingly, COT 100 supports the provision of dual 4-wire analog data services using 2B1Q transmission over a single twisted pair line 120 between a telephone company location and a customer premises. Appendix I provides a schematic representation of FIG. 2 (© Copyright, Unpublished Work, Raychem Corporation, All Rights Reserved) for COT 100 discussed above.

B. Remote Terminal (RT) Hardware

Figure 3:
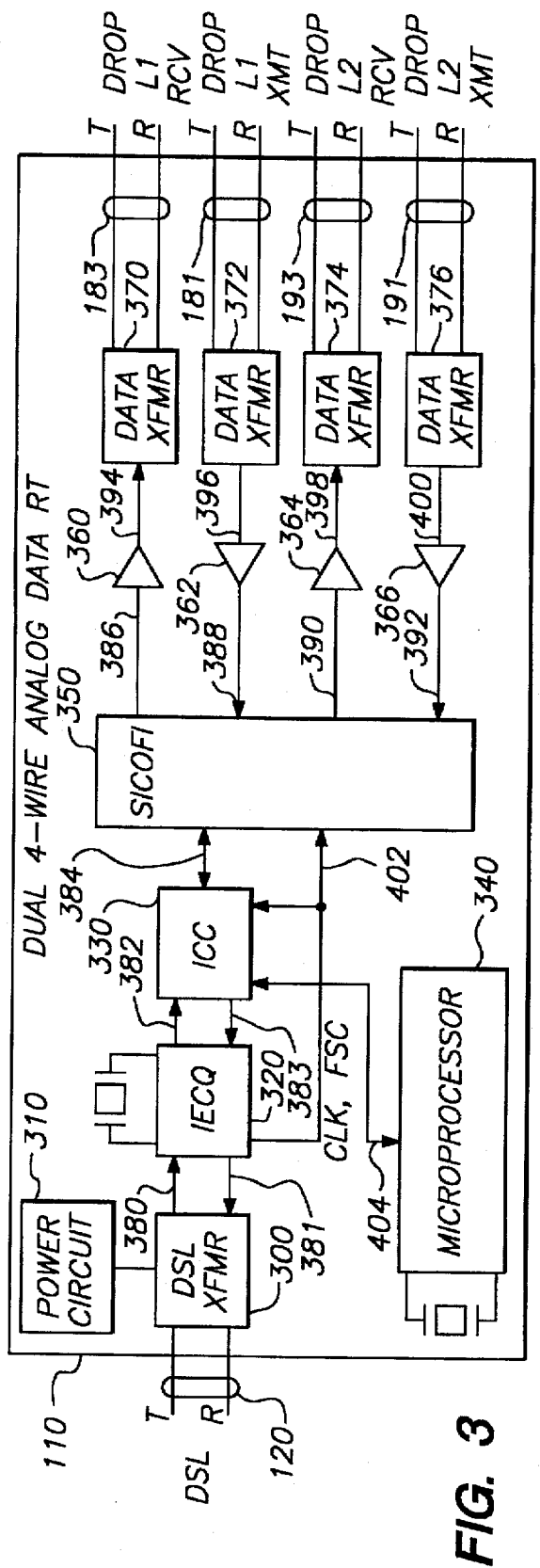
FIG. 3 illustrates a simplified block diagram of the remote terminal (RT) of an embodiment of the present invention.

FIG. 3 illustrates a simplified diagram of RT 110 according to an embodiment of the present invention. Coupled to DSL 120, RT 110 includes a DSL transformer 300, a voltage and current surge protection/power circuitry 310 (which includes a DC chopper such as a Motorola MC33129, a power transformer, a bridge rectifier, etc.), an IECQ 320, an ICC 330, a microprocessor 340, a SICOFI 350, amplifying circuits 360, 362, 364 and 366, data transformers 370, 372, 374 and 376, and other elements.

As seen in FIG. 3, DSL transformer 300 is coupled to power circuitry 310, which protects DSL 120 and also converts −135 volts DC power from DSL 120 into +/−5 volts DC power for use by RT 110. DSL transformer 300 is also coupled to IECQ 320 via lines 380 and 381. IECQ 320 is coupled to ICC 330 via lines 382 and 383. ICC 330 is coupled to SICOFI 350 via serial input/output port (SIP) bus line 384. SICOFI 350 is further coupled to amplifying circuits 360, 362, 364 and 366, respectively, via lines 386, 388, 390 and 392. Amplifying circuits 360, 362, 364 and 366 are coupled respectively to data transformers 370, 372, 374 and 376. RT 110 is also coupled via data transformers 370, 372, 374 and 376 to respective lines 181, 183, 191 and 193, which connect to two 4-wire analog data circuits 160 and 170. RT 110 may be placed at the customer premises, which is often a business or the like using 4-wire analog data service. RT 110 performs similar functions as COT 100.

RT 110 will first be described primarily with respect to downstream signals transmitted from COT 100 at the central office over DSL 120 for use at the customer premises.

The 2B1Q signal has a information transmission rate of 160 kbps (i.e., 80 kbaud symbol rate). DSL transformer 300 isolates, conditions, impedance matches, and performs two-wire to four-wire conversion of the 2B1Q signal for use by IECQ 320. The downstream data of the 2B1Q signal enters IECQ 320 from DSL transformer 300 through line 380, and upstream data of the 2B1Q signal enters DSL transformer 300 from IECQ 320 via line 381.

IECQ 320 converts the downstream data of the 2B1Q signal to a unidirectional 256 kbps downstream multiplexed binary signal for transmission through line 382 to ICC 330. IECQ 320 includes a 512 kHz clock (CLK) signal and a 8 kHz frame synchronization clock (FSC) signal, which are synchronized to the 160 kbps 2B1Q signal from DSL 120. The CLK and FSC signals are also provided from IECQ 320 to ICC 330 and SICOFI 350 via line 402. The downstream multiplexed binary signal at 256 kbps includes user data as well as C & I and monitor data.

ICC 330 then transmits the unidirectional 256 kbps downstream multiplexed binary signal which is combined with the unidirectional 256 kbps upstream multiplexed binary signal to form the 512 kbps bi-directional "ping-ponged" transmission to SICOFI 350 via SIP bus line 384. Then, the process is repeated resulting in virtually concurrent transmission and reception of dual 4-wire analog data services. ICC 330 operates on the clock signals (CLK, FSC) from IECQ 320.

SICOFI 350 demultiplexes the 8-bit words contained in the 256 downstream multiplexed binary signal into four 64 kbps signals, representing the first and second downstream analog data signal, C & I data, and monitor data. One 64 kbps downstream signal in one B-channel contains 8-bit PCM words representing samples (at a sampling rate of 8 kHz) of the first downstream analog data signal, and another 64 kbps downstream signal in the other B-channel contains 8-bit PCM words representing samples (at a sampling rate of 8 kHz) of the second downstream analog data signal. SICOFI 350 performs binary 8-bit word-to-analog conversion to produce the first and second downstream analog data signals.

The first downstream analog data signal exits SICOFI 350 via line 386 to enter amplifying circuit 360 for amplification before entering data transformer 370 via line 394 for impedance matching and conditioning for use at the first 4-wire analog data circuit 160 via twisted pair line 183. Similarly, the second downstream analog data signal exits SICOFI 350 via line 390 to enter amplifying circuit 364 for amplification before entering data transformer 374 via line 398 for impedance matching and conditioning for use at the second 4-wire analog data circuit 170 via twisted pair line 193.

The functionality of RT 110 is overseen by microprocessor 340 or the like, similar to COT 100. Monitor data, link status, and other data sent from COT 100 are made available to microprocessor 340 via line 404 from ICC 330. A clock provides timing information for the microprocessor 340 and the other components in RT 106.

Upstream signals are processed through RT 110 in a similar but reverse method from the downstream signals. In particular, the first upstream analog data signal is transmitted to data transformer 372 in RT 110 via twisted pair line 181 by the first 4-wire analog data circuit 160. The second upstream analog data signal is similarly transmitted to data transformer 376 in RT 110 via twisted pair line 191 by the second 4-wire analog data circuit 170. Data transformer 372 performs isolation, impedance matching, and conditioning of the first upstream analog data signal prior to amplification by amplifying circuit 362 via line 396. Data transformer 376 similarly performs isolation, impedance matching, and conditioning of the second upstream analog data signal for amplification by amplifying circuit 366 via line 400.

After amplification, the first upstream analog data signal enters SICOFI 350 via line 388, and the second upstream analog data signal enters SICOFI 350 via line 392. SICOFI 350 converts the first and second analog data signals into binary 8-bit PCM words (resulting in a first 64 kbps upstream binary signal and a second 64 kbps upstream binary signal in different B-channels), with 8 bits of C & I data and 8 bits of monitor data, resulting in a unidirectional upstream multiplexed binary signal of 32 bits/125 microseconds for a total bit rate of 256 kbps. The unidirectional upstream multiplexed binary signal is part of the 512 kbps bi-directional "ping-ponged" transmission over SIP bus line 384 between SICOFI 350 and ICC 330, as discussed above.

ICC 330 transmits the unidirectional upstream multiplexed binary signal at 256 kbps to IECQ 320 via line 383. By removing control and monitor information, IECQ 320 converts the upstream multiplexed binary signal at 256 kbps into 160 kbps data stream for encoding onto the 2B1Q signal. IECQ 320 then converts the 160 kbps data stream into the upstream data of the 2B1Q signal at an information rate of 160 kbps (i.e., 80 kbaud symbol rate).

The upstream data of the 2B1Q signal from IECQ 320 enters DSL transformer 300 via line 381. DSL transformer 300 isolates, impedance matches, conditions, and performs four-wire to two-wire conversion of the upstream and downstream data of the 2B1Q signal for two-wire transmission over DSL 120, which is a single twisted pair line. Therefore, RT 110 supports the provision of dual 4-wire analog data services using 2B1Q transmission over a single twisted pair line 120 between a telephone company location and a customer premises. Appendix II provides a schematic representation of FIG. 3 (© Copyright, Unpublished Work, Raychem Corporation, All Rights Reserved) for RT 110 discussed above.

C. RT/COT Components

Without in any way limiting the scope of the invention, Table 1 provides a list of commercially available components which are useful in the operation of COT 100 and RT 110 according to the above embodiments. It will be apparent to those of ordinary skill in the art that the components listed in Table 1 are merely representative of those which may be used in association with the inventions herein and are provided for the purpose of facilitating assembly of an apparatus in accord with the invention. A wide variety of components readily known and available to those of ordinary skill in the art could readily be substituted or functionality could be combined or even separated. It should be noted that CMOS-based integrated circuits have been utilized where possible so as to reduce power consumption of RT 110 in particular.

TABLE 1

| RT/COT Components | |
|---|---|
| IECQ | Siemens 2091 |
| ICC | Siemens 2070 |
| Microprocessor | Intel 80C31, 80C51 or 87C51 |
| SICOFI | Siemens 2260, or 2060 |
| Data transformer | Tracy Minntronics 5716 |
| Protection/Power circuit (RT) | Motorola MC33129; Tracy Minntronics 5754 |

D. Software/Microprocessor Functionality

The RT microprocessor discussed above is programmed with code adapted for use on an Intel 80C31 microprocessor, although it will be apparent that the invention could be applied to a wide variety of such processors. A similar code is used in the COT microprocessor. This code has been used in the Intel 80c31. Again, however, a wide variety of microprocessors such as an Intel 80c51 or others could be used herein without departing from the scope of the invention.

Figure 4A:
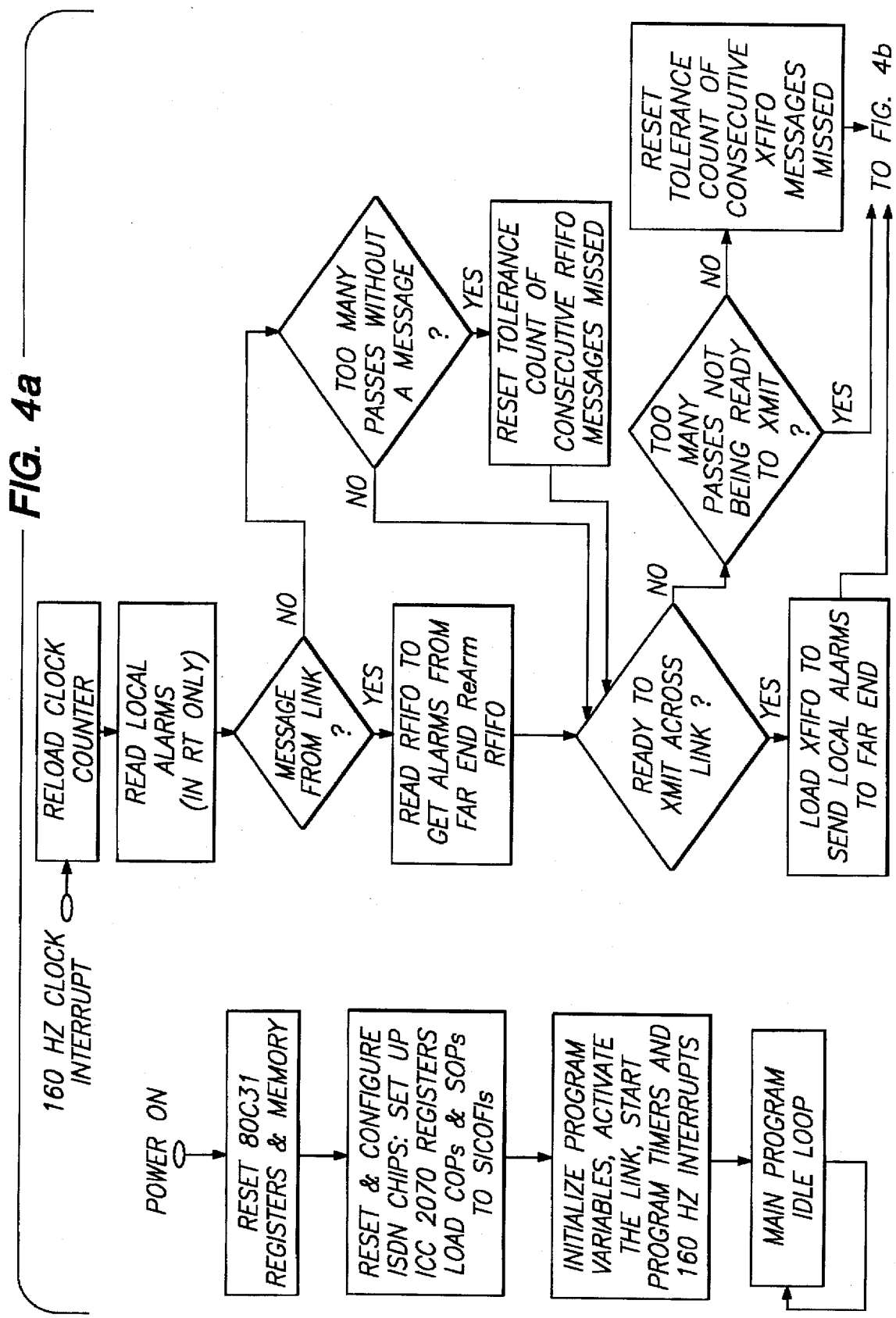

FIGS. 4a to 4d are simplified flow charts illustrating the functionality of the software used in the RT and COT, and provide an overview of the software. The left hand portion of FIG. 4a illustrates the power-up sequence used to initiate the system. The system begins by resetting the microprocessor registers and memory. The IECQ, the ICC, SICOFI, and the like are reset and configured. Variables within the program are, thereafter, activated, timers are started, and 160 Hz interrupts are started. The program then enters a main loop, which is illustrated in detail beginning on the right half of FIG. 4a.

Upon receiving a 160 Hz clock interrupt, the system reloads the clock counter and, in the RT, reads any local alarms (such as alarms from a burglar alarm and the like). The system then maintains the permanent off-hook status of both lines and determines if a message has been transmitted over the link from the RT/COT. If a message has been transmitted over the link, the system reads the message to determine any alarms. If there is not a message from the other end of the link, the system determines if it has made more than a preset number of passes without a message from the other end of the link. If so, the tolerance count of consecutive messages missed is reset and an alarm is set which may be, for example, passed off to a CO.

In any event, the system then goes on to determine if it is ready to transmit across the link by checking a flag in the ICC. If not, a similar test and reset procedure is followed to that described above for receiving messages. If the link is ready to transmit, the messages are loaded and sent to the RT/COT from the COT/RT.

Referring to FIG. 4b, the system then determines if there has been any change in the C & I channel from the SICOFI. If not, the system determines if the link is down and, if not, continues on. If the link is down, the system compares the number of passes to a limit and, if the link has been down for greater than that limit, resets a link missing tolerance count and issues a command to reactivate the link.

If there has been a change on the C & I channel, the system then determines if the change has been an activation indication. If not, the system determines if the link was previously up and, if not, the loop continues. If the link was previously up, the alarm data for the far end is reset. An indication is also provided to the user that the analog data service lines are down and the alarms are on. The missing tolerance count is reset and a command is then issued to reactivate the link.

Referring to FIG. 4b, if the change on a C & i channel was an activation indication, the link transmitter and receiver are reset, and an indication is provided that the link is up. The system then continues through the main loop.

Figure 4C:
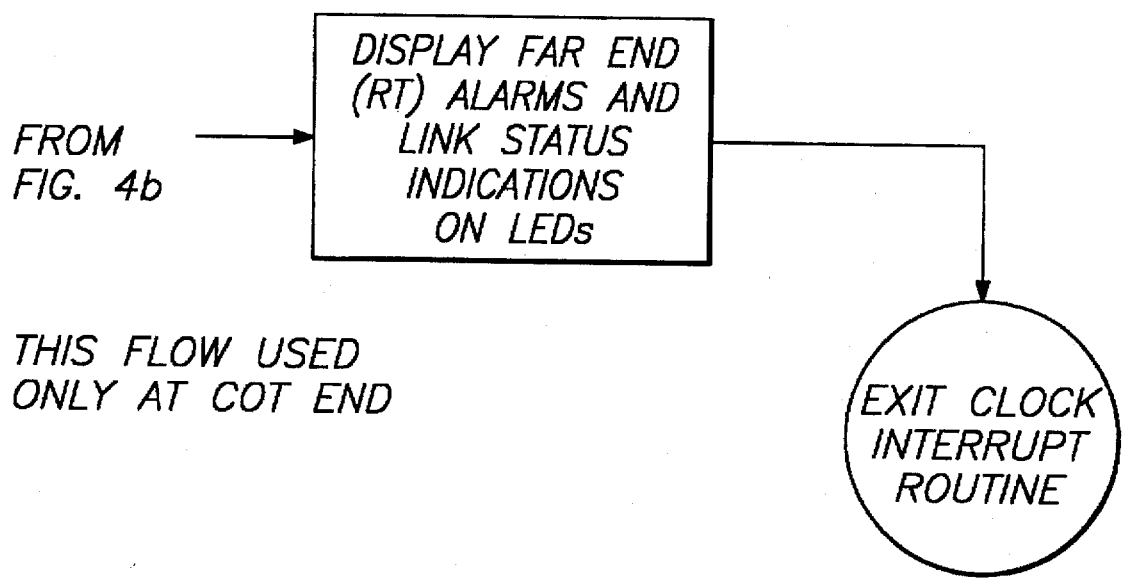
Figure 4D:
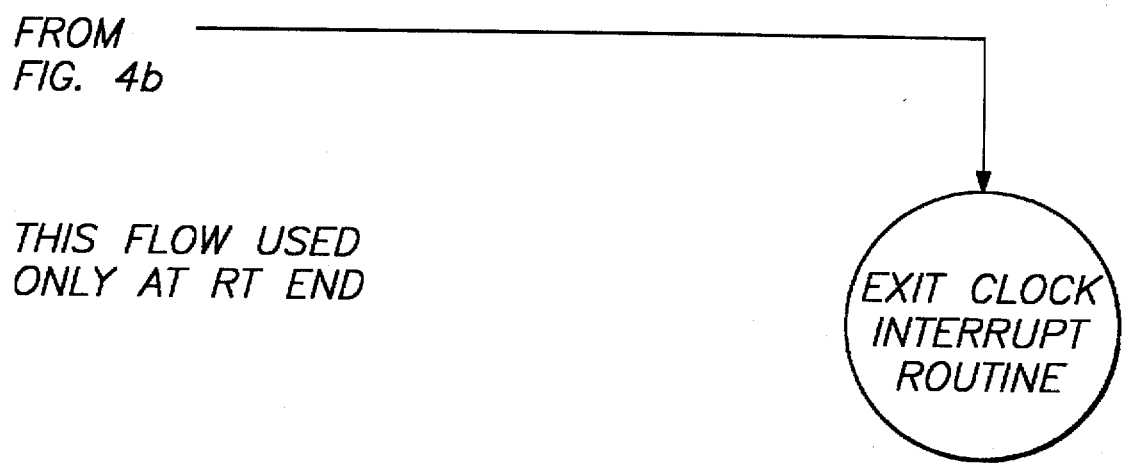

As seen in FIG. 4c, in the COT end, the main loop then provides alarm and link status indications for display on appropriate light emitting diodes (LEDs). The clock interrupt routine is then exited at the COT. Referring to FIG. 4d, the main loop in the RT continues by exiting the clock interrupt routine.

III. Conclusion

The inventions claimed herein provide an improved method and apparatus for transmitting dual 4-wire analog data services over a single twisted pair. It is to be understood that the above description is intended to be illustrative and not restrictive. Many embodiments will be apparent to those of skill in the art upon reviewing the above description. By way of example the inventions herein have been illustrated primarily with regard to transmission of dual 4-wire analog data services, but they are not so limited. For example, the inventions could be applied in the transmission and reception of other types of signals such as radio and TV signals, telephoto, teletype, facsimile, and other electromagnetic and/or optical signals. By way of further example, the inventions have been illustrated above with reference to the simultaneous transmission of dual 4-wire analog data services over a single twisted pair, but the inventions could be extended to transmit even more than two 4-wire analog data services simultaneously over a single twisted pair. By way of still further example, the invention has been illustrated in conjunction with specific integrated circuits and operating speeds, but the invention is not so limited. The scope of the inventions should, therefore, be determined not with reference to the above description, but should instead be determined with reference to the appended claims, along with the full scope of equivalents to which such claims are entitled by one of ordinary skill in the art.

What is claimed is:

1. A method for providing dual 4-wire analog data services between a telephone company location and a customer premises over a ingle twisted pair, said method comprising:

at the telephone company location
      converting two downstream analog data signals into a downstream multiplexed binary signal and converting an upstream multiplexed binary signal into two upstream analog data signals;
      converting the downstream multiplexed binary signal and the upstream multiplexed binary signal to a digital encoded signal, wherein the digital encoded signal is selected from a group consisting of 2B1Q and 4B3T signals;
      transmitting the digital encoded signal over said single twisted pair between the telephone company location and the customer premises; and at the customer premises
      converting the digital encoded signal into the downstream multiplexed binary signal and the upstream multiplexed binary signal; and
      converting the downstream multiplexed binary signal into two downstream analog data signals for use by two 4-wire analog data circuits at the customer premises and converting two upstream analog data signals from said two 4-wire analog data circuits at the customer premises into the upstream multiplexed binary signal.

2. The method as recited in claim 1 wherein the digital encoded signal has a 160 kbps information rate.

3. The method as recited in claim 2 wherein said single twisted pair is at least 18,000 feet of mixed gauge wire.

4. Apparatus for providing dual 4-wire analog data services between a telephone company location and a customer location over a single twisted pair, said apparatus comprising:

a) a remote terminal for use at the customer location, said remote terminal comprising:
      i) a remote terminal IECQ for converting a digital encoded signal on said single twisted pair to multiplexed binary signals;
      ii) a remote terminal ICC coupled to said remote terminal IECQ for adding and removing control information to and from the multiplexed binary signals; and
      iii) a remote terminal SICOFI coupled to said remote terminal ICC for converting multiplexed binary signals from and to said remote terminal IECQ to and from four analog data signals for use in two 4-wire analog data circuits coupled to said remote terminal SICOFI;

b) a central office terminal comprising:
  i) a central office terminal SICOFI for converting four analog data signals at a telephone company location to and from multiplexed binary signals;
  ii) a central office terminal ICC coupled to said central office terminal SICOFI for adding and removing control information to and from multiplexed binary signals from said central office terminal SICOFI; and
  iii) a central office terminal IECQ coupled to said central office terminal ICC for conversion of multiplexed binary signals to digital encoded signal for transmission over said single twisted pair; and wherein the digital encoded signal is selected from a group consisting of 2B1Q and 4B3T signals.

5. The apparatus as recited in claim 4 wherein said remote terminal is located at a terminus of said single twisted pair at, near, or in a business subscriber premises and said central office terminal is located at a telephone company central office.

6. The apparatus as recited in claim 4 wherein said remote terminal and central office terminal IECQs are adapted to transmit and receive substantially 80 kbaud signals.

7. The apparatus as recited in claim 5 wherein said remote terminal and central office terminal ICCs are adapted to transmit and receive substantially 160 kbps signals.

8. In a system for transmission of a single analog signal from a telephone company location to a subscriber location over a single twisted pair, a method of converting said system to a system for multiple analog data signal transmission over said single twisted pair comprising:
  a) installing a central office terminal at said telephone company location, said central office terminal:
    i) inputting multiple downstream analog data signals from telephone company equipment and outputting multiple upstream analog data signals to said telephone company equipment;
    ii) converting said multiple downstream analog data signals and said multiple upstream analog data signals into a digital encoded signal for transmission over said single twisted pair between the telephone company location and the subscriber location; and
  b) installing a remote terminal at said subscriber location, said remote terminal:
    i) converting said digital encoded signal from said single twisted pair into the multiple upstream analog data signals and the multiple downstream analog data signals; and
    ii) transmitting said multiple downstream analog data signals to multiple 4-wire analog data circuits and receiving said multiple upstream analog data signals from said multiple 4-wire analog data circuits.

9. The method as recited in claim 8 wherein the digital encoded signal are 160 kbps information rate signals.

10. The method as recited in claim 9 wherein the digital encoded signal is a 80 kbaud 2B1Q signal.

11. The method as recited in claim 9 wherein the digital encoded signal is a 120 kbaud 4B3T signal.

12. The method as recited in claim 10 wherein said single twisted pair is at least 18,000 feet of mixed gauge wire.

13. The method as recited in claim 10 wherein said system for transmission of the single analog signal from the telephone company location to the subscriber location over the single twisted pair provides a single 4-wire analog data service using the single twisted pair and an additional twisted pair, and said method converts said system into a multiple 4-wire analog data services system over said single twisted pair thereby leaving the additional twisted pair available for other uses.

* * * * *